US010648614B2

(12) United States Patent
Bailey

(10) Patent No.: US 10,648,614 B2
(45) Date of Patent: May 12, 2020

(54) SATELLITE ANTENNA MOUNTING SYSTEMS AND METHODS

(71) Applicant: DISH Network L.L.C., Englewood, CO (US)

(72) Inventor: Matthew Bailey, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 60 days.

(21) Appl. No.: 15/858,610

(22) Filed: Dec. 29, 2017

(65) Prior Publication Data
US 2019/0203880 A1 Jul. 4, 2019

(51) Int. Cl.
*F16M 13/02* (2006.01)
*F16B 2/18* (2006.01)
*H01Q 1/12* (2006.01)
*F16B 2/00* (2006.01)
*F16B 2/10* (2006.01)

(52) U.S. Cl.
CPC ........... *F16M 13/025* (2013.01); *F16B 2/005* (2013.01); *F16B 2/10* (2013.01); *F16B 2/18* (2013.01); *H01Q 1/1221* (2013.01); *H01Q 1/125* (2013.01)

(58) Field of Classification Search
CPC ......... F16M 13/025; F16B 2/005; F16B 2/10; F16B 2/18; H01Q 1/1221; H01Q 1/125; H01Q 1/228; H01Q 3/02
USPC .......... 248/216.4, 237, 205.1, 218.4, 222.51, 248/122.1, 371, 372.1, 419, 284.1, 291.1, 248/292.11, 292.13; 343/878, 880, 882, 343/892, 765, 757
See application file for complete search history.

(56) References Cited

U.S. PATENT DOCUMENTS

| | | | | |
|---|---|---|---|---|
| 403,636 | A * | 5/1889 | Bitterly | E06C 1/397 182/20 |
| 1,554,656 | A * | 9/1925 | Pusey | E04H 12/00 248/536 |
| 2,439,063 | A * | 4/1948 | Shur | E04H 12/32 248/237 |
| 2,596,543 | A * | 5/1952 | Fox | A63B 63/083 16/343 |
| 2,628,796 | A * | 2/1953 | Krizman | H01Q 1/1221 248/237 |
| 2,731,223 | A * | 1/1956 | Riccio | A47G 33/1246 248/229.15 |
| 2,731,225 | A * | 1/1956 | Cayo | H01Q 1/1221 248/314 |

(Continued)

*Primary Examiner* — Nkeisha Smith
(74) *Attorney, Agent, or Firm* — Kilpatrick Townsend & Stockton LLP

(57) ABSTRACT

Systems for coupling a satellite antenna to a structure is provided. The system may include a first element, a second element, a third element, and a tightening mechanism. The first element may include at least one protrusion. The second element may also include at least one protrusion. The third element may be rotatably coupled with the first element. The third element may also be rotatably coupled with the second element. The third element may further be configured to couple with the satellite antenna. The tightening mechanism may be operable to rotate at least one of the first element or the second element with respect to the third element such that at least one protrusion of the first element and at least one protrusion of the second element engage with the structure located between the first element and the second element.

16 Claims, 4 Drawing Sheets

(56) References Cited

U.S. PATENT DOCUMENTS

| | | | | |
|---|---|---|---|---|
| 2,733,031 A * | 1/1956 | Morgillo | H01Q 1/1221 | 248/316.6 |
| 2,837,304 A * | 6/1958 | Goss, Sr. | H01Q 1/1221 | 248/148 |
| 3,044,738 A * | 7/1962 | Kuchera | H01Q 1/1221 | 248/534 |
| 3,094,303 A * | 6/1963 | Belger | H01Q 1/1221 | 248/231.61 |
| 3,241,800 A * | 3/1966 | Richter, III | A47G 33/08 | 248/230.9 |
| 4,148,456 A * | 4/1979 | Garchinsky | G08G 1/095 | 248/219.4 |
| 4,181,284 A * | 1/1980 | Seppelfrick | F16M 13/02 | 248/282.1 |
| 4,210,302 A * | 7/1980 | Serkez | A45F 5/00 | 248/205.1 |
| 4,771,972 A * | 9/1988 | Shaw | F16B 2/18 | 182/92 |
| 4,781,348 A * | 11/1988 | Cutforth | H01F 27/06 | 211/107 |
| 4,801,121 A * | 1/1989 | Zunker | E05B 67/383 | 248/218.4 |
| 4,846,499 A * | 7/1989 | Izumi | B60K 15/067 | 280/830 |
| 5,462,246 A * | 10/1995 | Schlenker | F16L 3/1075 | 248/316.5 |
| 5,657,031 A * | 8/1997 | Anderson | H01Q 1/125 | 343/757 |
| 5,829,724 A * | 11/1998 | Duncan | H01Q 1/1221 | 248/237 |
| 6,202,977 B1 * | 3/2001 | Chapman | F24H 9/06 | 248/230.9 |
| 6,290,195 B1 * | 9/2001 | Deuer | A47B 96/06 | 248/230.8 |
| 6,731,250 B1 * | 5/2004 | Berman | H01Q 1/1221 | 343/878 |
| 7,254,895 B1 * | 8/2007 | O'Donnell | B25B 5/04 | 248/231.51 |
| 7,456,802 B1 * | 11/2008 | Bourgeois | H01Q 1/1221 | 343/878 |
| 7,789,360 B2 * | 9/2010 | Qualy | F16M 13/02 | 248/218.4 |
| 7,926,771 B2 * | 4/2011 | DeMartine | F16M 13/022 | 248/218.4 |
| 8,245,479 B2 * | 8/2012 | Gannon | E04C 3/005 | 52/641 |
| 8,939,415 B2 * | 1/2015 | Dillinger | E04G 3/265 | 248/148 |
| 8,979,051 B2 * | 3/2015 | Keller | F16B 2/10 | 248/230.5 |
| 9,337,545 B2 * | 5/2016 | Lettkeman | H01Q 1/125 | |
| 9,548,524 B1 * | 1/2017 | Wallman | H01Q 1/1207 | |
| 10,104,969 B2 * | 10/2018 | Gale | A47C 7/22 | |
| 2006/0016947 A1 * | 1/2006 | Capozzi | H01Q 1/1221 | 248/284.1 |
| 2011/0042537 A1 * | 2/2011 | Fahldiek | B65G 47/847 | 248/313 |
| 2011/0079691 A1 * | 4/2011 | Gorsuch | F41A 23/18 | 248/216.1 |
| 2011/0101190 A1 * | 5/2011 | Morren | F16B 2/10 | 248/316.5 |
| 2015/0297002 A1 * | 10/2015 | Long | A47G 1/20 | 248/217.2 |
| 2017/0302220 A1 * | 10/2017 | Martin | H02S 20/22 | |

* cited by examiner

SATELLITE ANTENNA MOUNTING SYSTEMS AND METHODS

BACKGROUND OF THE INVENTION

Various systems exist for attaching objects to structures. However, each of these systems have prerequisites regarding what portion, types, and/or constructions of structures they may be successfully employed on. Hence there is always a need for additional options to fill the gaps in application types left by existing systems.

Embodiments of the present invention provide improvements to existing systems, as well as solutions for scenarios left unresolved by existing systems.

BRIEF SUMMARY OF THE INVENTION

In one embodiment, a system for coupling a satellite antenna to a structure is provided. The system may include a first element, a second element, a third element, and a tightening mechanism. The first element may include at least one protrusion. The second element may also include at least one protrusion. The third element may be rotatably coupled with the first element. The third element may also be rotatably coupled with the second element. The third element may further be configured to couple with the satellite antenna. The tightening mechanism may be operable to rotate at least one of the first element or the second element with respect to the third element such that at least one protrusion of the first element and at least one protrusion of the second element engage with the structure located between the first element and the second element.

In another embodiment, a method for coupling a satellite antenna to a structure is provided. The method may include disposing an apparatus on a corner of the structure, where the apparatus includes a first element, a second element, a third element, and a tightening mechanism. The first element may include at least one protrusion. The second element may include at least one protrusion. The third element may be rotatably coupled with the first element. The third element may also be rotatably coupled with the second element. The third element may further be configured to couple with the satellite antenna. The tightening mechanism may be operable to rotate at least one of the first element or the second element with respect to the third element. The method may also include operating the tightening mechanism such that the at least one protrusion of the first element and the at least one protrusion of the second element engage with the structure located between the first element and the second element.

BRIEF DESCRIPTION OF THE DRAWINGS

Embodiments of the present invention are described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to any embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced with or without these specific details.

Figure 1:
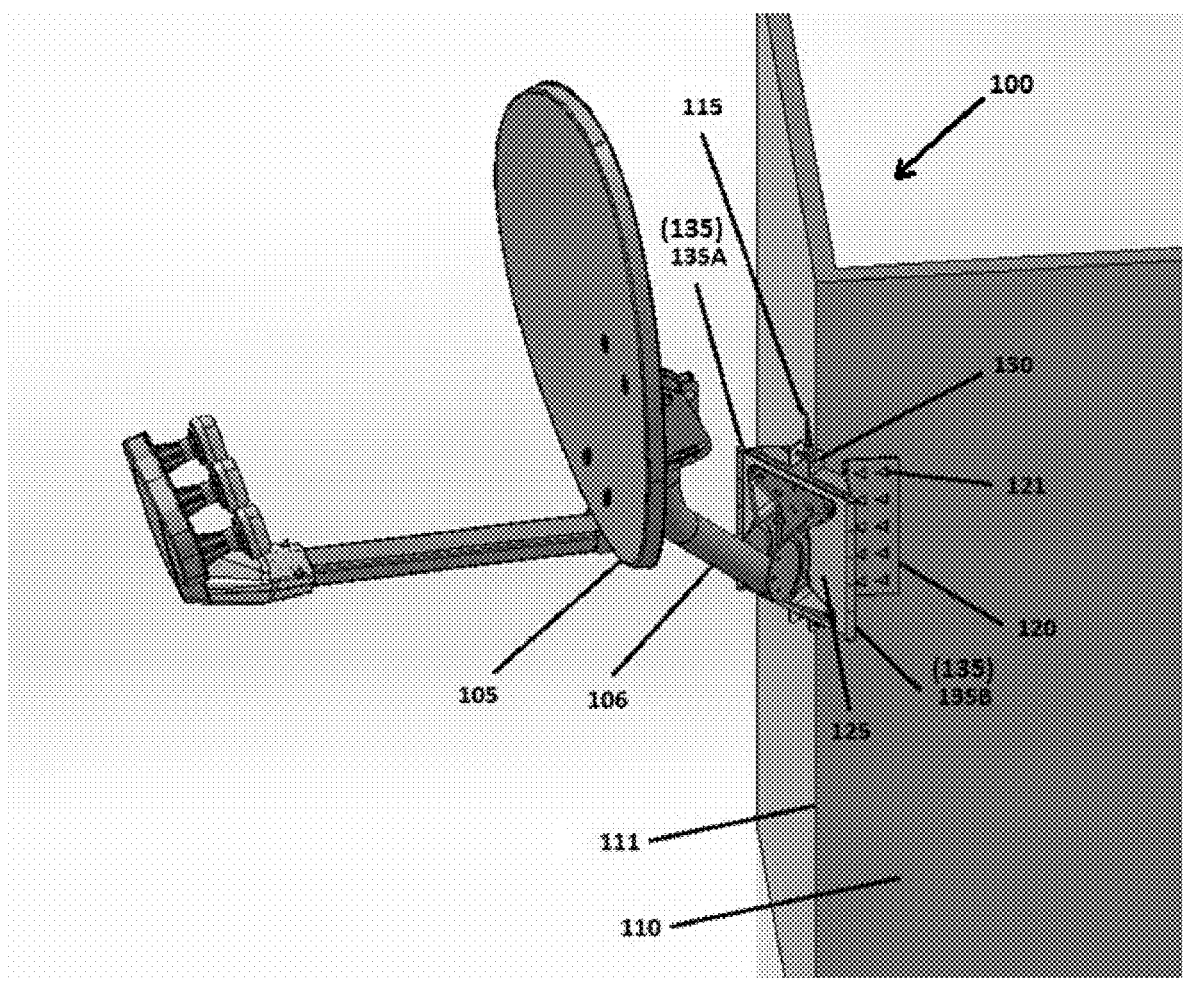
FIG. 1 illustrates a perspective view of one apparatus embodiment of the invention for coupling a satellite antenna to a structure.
Figure 2:
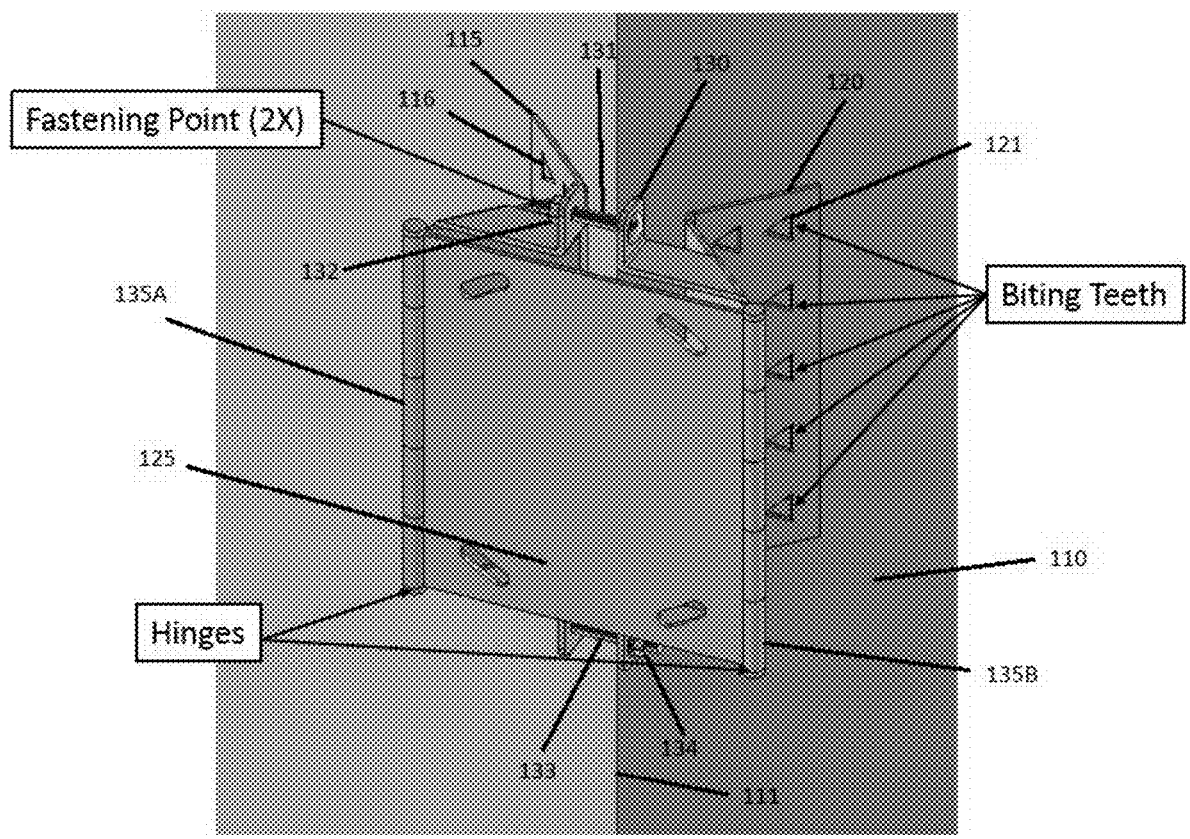
FIG. 2 illustrates a perspective view of the apparatus from FIG. 1, without the satellite antenna and arm assembly.
Figure 3:
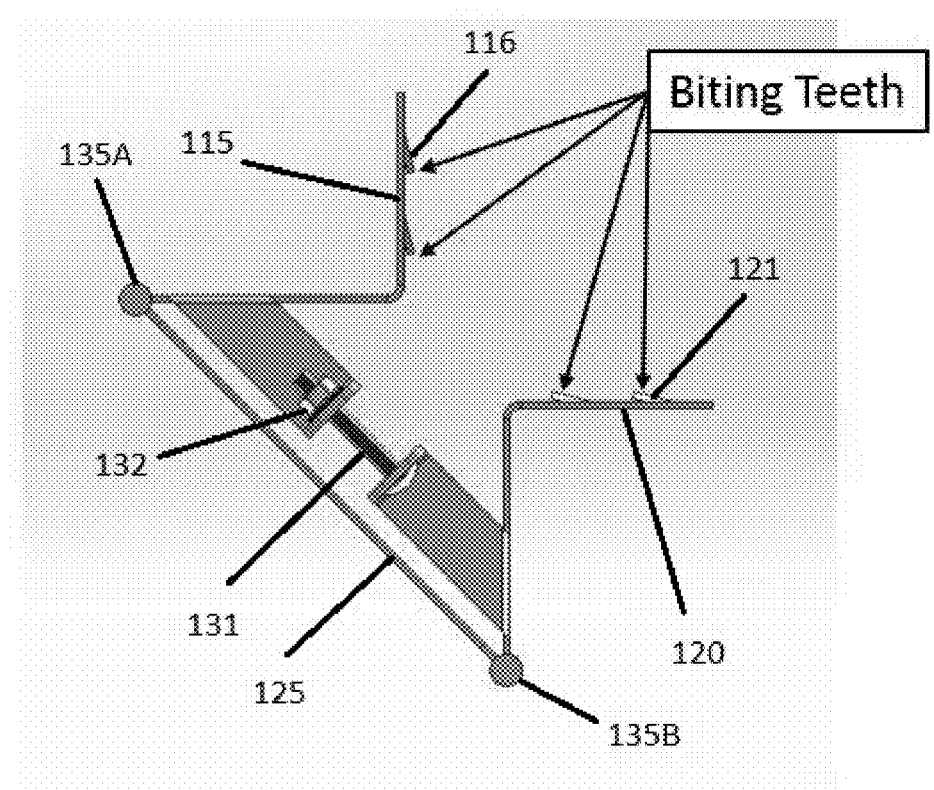
FIG. 3 illustrates a plan view of the apparatus as shown in FIG. 1.

In one embodiment, as shown in FIG. 1, FIG. 2, and FIG. 3, a system 100 for coupling a satellite antenna 105 to a structure 110 is provided. System 100 may include a first element 115, a second element 120, a third element 125, and a tightening mechanism 130. System 100 may allow an installer to more easily mount a satellite antenna 105 (via arm 106) on a portion of structure 110 than other means known in the art, especially where constraints on the desired orientation of satellite antenna 105, and/or the construction of the structure prevent other means from being successfully employed.

Though in many embodiments a satellite antenna, as employed in satellite television receiving systems, may be the object desired to be mounted, in other embodiments other devices may be coupled with system 100. Merely by way of example, traditional terrestrial antennas, wireless networking antennas, wireless power transmission systems, video cameras, and/or other devices may also be mounted to structures using system 100.

Additionally, though mounting of devices to structures such as buildings and other permanent and temporary structures may be the focus of this disclosure, other objects may serve as the foundation to which system 100 may be applied to allow devices to be mounted thereto. Merely by way of example, vehicles, poles, and even natural objects may serve as the foundational objects. While foundational objects having corners are ideal, rounded surfaced objects may also be employed so long as the protrusions discussed below are capable of establishing a firm enough connection with the foundation object to support the weight of system 100 and the device mounted thereto.

First element 115 may include a plate like member, and may include at least one protrusion 116 on a backside of the element. Similarly, second element 120 may also include a substantially plate like member, and may also include at least one protrusion 121 on a backside of the element. Protrusions 116, 121 may be any shape that is conducive to penetrating and gripping structure 110 once system 100 is properly applied to structure 110 as described herein. Any number of protrusions 116, 121 may be present on either of first element 115 and second element 120, and protrusions 116, 121 may be regularly or irregularly placed on either element.

In some embodiments, protrusions 116, 121 may be triangle shaped, and may be cut and bent from first element 115 and second element 120 as those elements existed in their originally manufactured plate like structure. Other shapes are possible, but in exemplary embodiments they may be pointed tooth shaped features, as shown, which generally point towards third element 130 (i.e., the corner 111 of structure 110), rather than away from third element 130 (i.e., away from corner 111 of structure 110), for reasons that will become apparent within this disclosure.

Third element 125 may be rotatably coupled with first element 115 and second element 120. In some embodiments, the rotatable couplings may be hinges 135 (135A, 135B) as shown, though other rotational coupling mechanisms known in the art may also be employed in some embodiments. Hinges 135 may have rotational axes that are parallel to each other.

Tightening mechanism 130 may be operable to rotate at least one of first element 115 or second element 120 with respect to third element 125 such that at least one protrusion 116 of first element 115 and at least one protrusion 121 of second element 120 engage with structure 110 located between first element 115 and second element 120. In this manner, after system 100 is placed on corner 111 of structure 110, and tightening mechanism 130 is operated/tightened, protrusions 116, 121 may penetrate an outer surface of corner 111 such that system 100 is secured in place on structure 110.

In some embodiments, if tightening mechanism 130 is tightened enough, a portion of first element 115 and second element 120, besides protrusions 116, 121 may also be pulled into the surface of structure 110 (i.e., recessing first element 115 and second element 120 into structure 110). In most embodiments, first element 115 and second element 120 may be substantially flush with each side of corner 111 once installed on structure 110.

Tightening mechanism 130 may be constructed in various manners, including any means which allows for first element 115 to be pulled toward second element 120, and vice versa. In the embodiment shown, tightening mechanism 130 may include a first bolt 131 coupled with first element 115 and second element 120, as well as a first nut 132 operably coupled with first bolt 131. In this manner, as first nut 132 is tightened about first bolt 131, first element 115 is pulled relatively closer to second element 120. Merely by way of example, As also shown, a second matching assembly including a second bolt 133 and a second nut 134 operating in substantially the same manner may also be present, providing a means to ensure substantially similar force is being applied across all protrusions 116, 121 on both first element 115 and second element 121. The longitudinal axes of bolts 131, 133 may be perpendicular to the rotational axes of hinges 135.

As an installer gradually, alternatingly, and repeatedly tightens both first nut 132 and second nut 134, protrusions 116, 121 may bite into structure 110, thereby securing system 100 to corner 111 of structure 110, providing a secure mounting of satellite antenna 105. Protrusions 116, 121 may be pointed/sloped inward toward structure 110 in order to facilitate tightening mechanism 130 "drawing in" first element 115 and second element 120 toward structure 110.

Though system 100 may be employed in many situations and circumstances, structures made from materials softer and less brittle than the material from which system 100 is made be more ideal for application of system 100. Merely by way of example, buildings with wooden; stucco; aluminum, composite, or plastic siding; and/or exterior insulation and finish system (EIFS) construction may allow for greater penetration of protrusions 116, 121, and therefore greater stability of system 100 once installed.

Certain building materials such as brick, stone, and/or concrete may be less ideal, and may require that an additional material is secured to the desired mounting location prior to mounting system 100 so that protrusions 116, 121 may "bite" into the additional material (since they might not be able to "bite" into the base structure material). Merely by way of example, adhesive or other fasteners may be used to secure wood or some other soft material to a brick or other hard structure surface to allow for mounting of system 100 on top of the wood or some other soft material.

Figure 4:
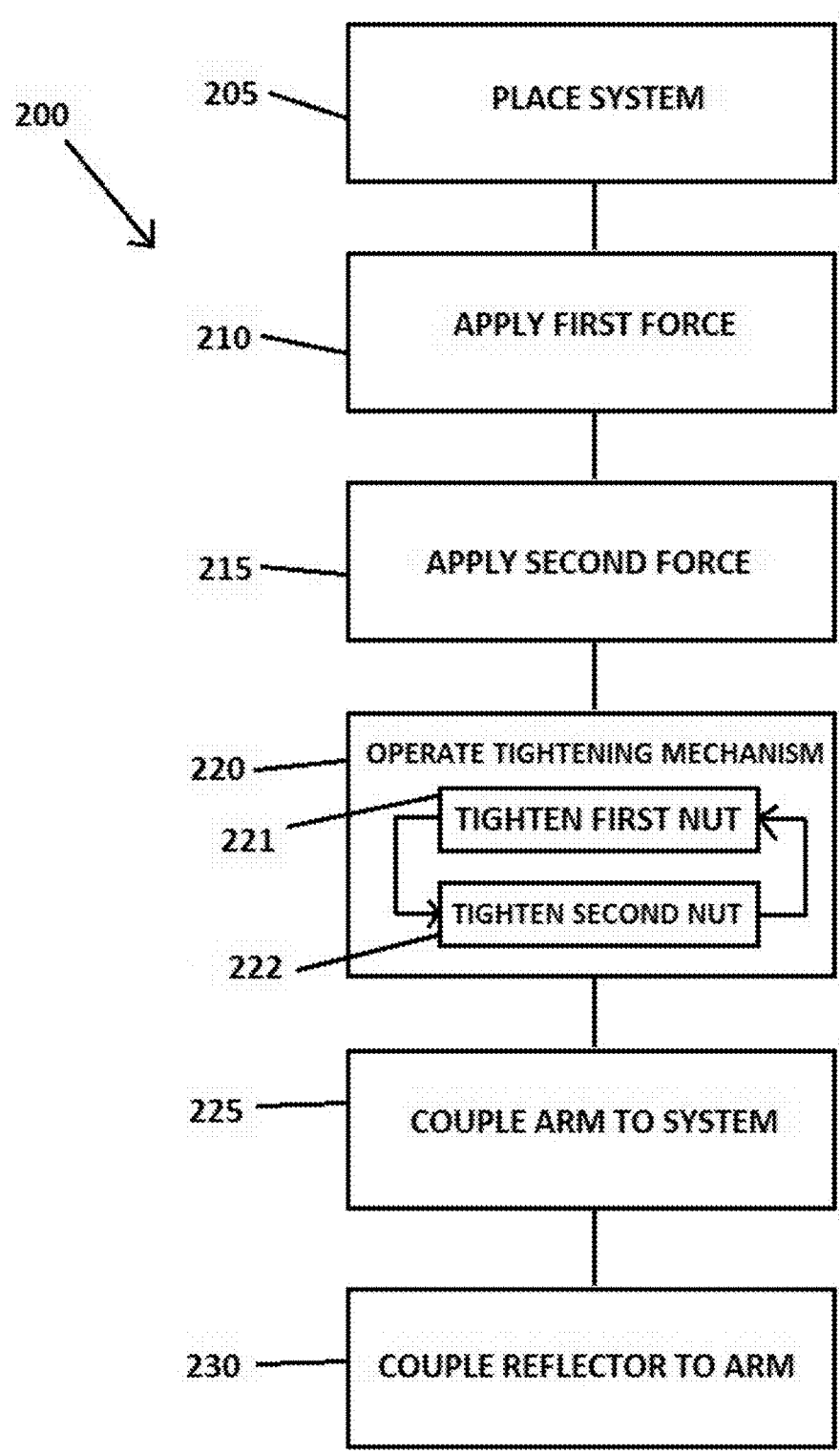
FIG. 4 is a flow diagram of one method of the invention for installing an apparatus such as the one illustrated in FIG. 1 on a structure to provide a mount for a satellite antenna on said structure.

In another embodiment, as shown in FIG. 4, a method 200 for coupling a satellite antenna to a structure is provided using system 100.

At step 205, system 100 is disposed at the desired location on corner 111 of structure 110. The location may be selected based on the direction in which the installer desired the satellite antenna to point, and the material from which corner 111 is constructed (i.e., a softer more ideal material).

At step 210, a first force may be applied to first element 115 to provide an initial grip of protrusions 116 into structure 110. At step 215, a second force may be applied to second element 120 to provide an initial grip of protrusions 121 into structure 110. Merely by way of example, an installer may use a hammer or other implement to tap the front side of first element 115 and second element 120 to provide the aforementioned forces.

At step 220, tightening mechanism 130 may be operated such that protrusions 116 of first element 115 and protrusions 121 of second element 120 engage with structure 110 located between first element 115 and second element 120. This may involve the sub-steps of 221, 222 where first nut 132 and second nut 134 are gradually, alternatingly, and repeatedly tightened until first element 115 and second element 120 are firmly flush with, or embedded in, structure 110.

At step 225, arm 106 may be coupled with third element 125. At step 230, satellite antenna 105 may be coupled with arm 106, thereby completing method 200.

Various embodiments of the invention have now been described in detail for the purposes of clarity and understanding. However, it will be appreciated that certain changes and modifications may be practiced within the scope of the appended claims.

What is claimed is:

1. A system for coupling a satellite antenna to a structure, wherein the system comprises:
   a first element that includes a first plurality of protrusions located on a first planar surface of the first element, wherein the first element that includes the first plurality of protrusions is made from a first single piece of material;

a second element that includes a second plurality of protrusions located on a second planar surface of the second element, wherein the second element that includes the second plurality of protrusions is made from a second single piece of material;

a third element, wherein:
the third element is rotatably coupled with the first element;
the third element is rotatably coupled with the second element; and
the third element is configured to couple with the satellite antenna; and a tightening mechanism comprising:
a first bolt coupled with the first element and the second element; and
a first nut operably coupled with the first bolt, wherein tightening the first nut rotates at least one of the first element or the second element towards the third element, wherein the tightening mechanism is operable to rotate at least one of the first element or the second element with respect to the third element such that the first plurality of protrusions of the first element and the second plurality of protrusions of the second element engage with the structure which is located between the first element and the second element.

2. The system for coupling the satellite antenna to the structure of claim 1, wherein the system further comprises:
a first hinge; and
a second hinge, wherein:
the third element being rotatably coupled with the first element comprises:
the third element being coupled with the first hinge; and
the first element being coupled with the first hinge; and
the third element being rotatably coupled with the second element comprises:
the third element being coupled with the second hinge; and
the second element being coupled with the second hinge.

3. The system for coupling the satellite antenna to the structure of claim 1, wherein:
the third element being rotatably coupled with the first element comprises the third element being rotatably coupled with the first element about a first axis; and
the third element being rotatably coupled with the second element comprises the third element being rotatably coupled with the second element about a second axis, wherein the second axis is different than the first axis, and wherein the second axis is parallel with the first axis.

4. The system for coupling the satellite antenna to the structure of claim 1, wherein the tightening mechanism further comprises:
a second bolt coupled with the first element and the second element; and
a second nut operably coupled with the second bolt, wherein tightening the second nut rotates at least one of the first element or the second element towards the third element.

5. The system for coupling the satellite antenna to the structure of claim 4, wherein:

a longitudinal axis of the first bolt is perpendicular to an axis of rotation of the first element with respect to the third element; and
a longitudinal axis of the second bolt is perpendicular to an axis of rotation of the second element with respect to the third element.

6. The system for coupling the satellite antenna to the structure of claim 1, wherein the first plurality of protrusions of the first element and the second plurality of protrusions of the second element engaging with the structure located between the first element and the second element comprises:
the first plurality of protrusions of the first element engaging with a first face of the structure; and
the second plurality of protrusions of the second element engaging with a second face of the structure, wherein the first face of the structure meets the second face of the structure at a corner of structure.

7. The system for coupling the satellite antenna to the structure of claim 1, wherein the first plurality of protrusions of the first element and the second plurality of protrusions of the second element engaging with the structure comprises:
the first plurality of protrusions of the first element penetrating an outer surface of a first face of the structure; and
the second plurality of protrusions of the second element penetrating an outer surface of a second face of the structure.

8. A system for coupling an antenna to a structure, wherein the system comprises:
a first element that includes at least one protrusion, wherein the at least one protrusion of the first element comprises a pointed tooth which is generally pointed towards a second element and a third element;
the second element that includes at least one protrusion, wherein the at least one protrusion of the second element comprises a pointed tooth which is generally pointed towards the first element and the third element;
the third element, wherein:
the third element is rotatably coupled with the first element;
the third element is rotatably coupled with the second element; and
the third element is configured to couple with the antenna; and
a tightening mechanism operable to rotate at least one of the first element or the second element with respect to the third element such that the at least one protrusion of the first element and the at least one protrusion of the second element engage with the structure which is located between the first element and the second element.

9. A method for coupling a satellite antenna to a structure, wherein the method comprises:
disposing an apparatus on a corner of the structure, wherein the apparatus comprises:
a first element that includes at least one protrusion, wherein the first element that includes the at least one protrusion is made from a first single piece of material;
a second element that includes at least one protrusion, wherein the second element that includes the at least one protrusion is made from a second single piece of material;
a third element, wherein:
the third element is rotatably coupled with the first element;

the third element is rotatably coupled with the second element; and
the third element is configured to couple with the satellite antenna; and
a tightening mechanism comprising:
a first bolt coupled with the first element and the second element; and
a first nut operably coupled with the first bolt, wherein tightening the first nut rotates at least one of the first element or the second element towards the third element, wherein the tightening mechanism is operable to rotate at least one of the first element or the second element with respect to the third element;
tightening the first nut to rotate at least one of the first element or the second element towards the third element; and
operating the tightening mechanism such that the at least one protrusion of the first element and the at least one protrusion of the second element engage with the structure which is located between the first element and the second element.

10. The method for coupling the satellite antenna to the structure of claim 9, wherein the method further comprises:
prior to operating the tightening mechanism, applying a first force to the first element to begin engagement of the at least one protrusion of the first element with the structure.

11. The method for coupling the satellite antenna to the structure of claim 10, wherein the method further comprises:
prior to operating the tightening mechanism, applying a second force to the second element to begin engagement of the at least one protrusion of the second element with the structure.

12. The method for coupling the satellite antenna to the structure of claim 9, wherein:
the tightening mechanism further comprises:
a second bolt coupled with the first element and the second element; and
a second nut operably coupled with the second bolt; and
the method further comprises tightening the second nut to rotate at least one of the first element or the second element towards the third element.

13. The method for coupling the satellite antenna to the structure of claim 12, wherein tightening the first nut to rotate at least one of the first element or the second element towards the third element and tightening the second nut to rotate at least one of the first element or the second element towards the third element comprises:
alternatingly and repeatedly tightening the first nut and the second nut.

14. The method for coupling the satellite antenna to the structure of claim 9, further comprising:
coupling an arm with the third element; and
coupling the satellite antenna with the arm.

15. The method for coupling the satellite antenna to the structure of claim 9, wherein the at least one protrusion of the first element and the at least one protrusion of the second element engaging with the structure comprises:
the at least one protrusion of the first element penetrating an outer surface of a first face of the structure; and
the at least one protrusion of the second element penetrating an outer surface of a second face of the structure.

16. The method for coupling the satellite antenna to the structure of claim 9, wherein:
the at least one protrusion of the first element comprises a pointed tooth which is generally pointed towards the second element and the third element;
the at least one protrusion of the second element comprises a pointed tooth which is generally pointed towards the first element and the third element; and
the at least one protrusion of the first element and the at least one protrusion of the second element engaging with the structure comprises:
the pointed tooth of the first element penetrating an outer surface of the structure in a first direction of the pointed tooth of the first element; and
the pointed tooth of the second element penetrating the outer surface of the structure in a second direction of the pointed tooth of the second element.

\* \* \* \* \*